US012652683B2

(12) United States Patent
Kim et al.

(10) Patent No.: US 12,652,683 B2
(45) Date of Patent: Jun. 9, 2026

(54) METHOD AND APPARATUS BY WHICH LTE V2X AND NR V2X COEXIST IN SAME FREQUENCY BAND

(71) Applicant: LG Electronics Inc., Seoul (KR)

(72) Inventors: Heejin Kim, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 18/037,829

(22) PCT Filed: Nov. 18, 2021

(86) PCT No.: PCT/KR2021/017011
§ 371 (c)(1),
(2) Date: May 19, 2023

(87) PCT Pub. No.: WO2022/108367
PCT Pub. Date: May 27, 2022

(65) Prior Publication Data
US 2024/0008061 A1      Jan. 4, 2024

(30) Foreign Application Priority Data

Nov. 20, 2020    (KR) ........................ 10-2020-0156960

(51) Int. Cl.
*H04W 72/40*          (2023.01)
(52) U.S. Cl.
CPC .................................. *H04W 72/40* (2023.01)
(58) Field of Classification Search
CPC .................................................... H04W 72/40
See application file for complete search history.

(56) References Cited

U.S. PATENT DOCUMENTS

2020/0314713 A1    10/2020  Jung et al.
2022/0330266 A1*   10/2022  Huang .............. H04W 28/0268
2022/0400497 A1*   12/2022  Wang .................... H04W 72/02

FOREIGN PATENT DOCUMENTS

WO      WO 2020033735       2/2020

OTHER PUBLICATIONS

3GPP TS 38.331 V16.2.0 (Sep. 2020), 3rd Generation Partnership Project Technical Specification Group Radio Access Network, study on Radio Resource Control (RRC) protocol specification(Release 16), Sep. 2020, 923 pages.

(Continued)

*Primary Examiner* — Won Tae C Kim
(74) *Attorney, Agent, or Firm* — Fish & Richardson P.C.

(57)          ABSTRACT

Provided are a method by which a first apparatus performs wireless communication, and an apparatus supporting same. The method comprises the steps of from among a first resource for which evolved-universal mobile telecommunications system (UMTS) terrestrial radio access (E-UTRA)-based sidelink (SL) communication and NR-based SL communication are allowed and a second resource for which the NR-based SL communication is allowed, determining to perform NR SL communication on the basis of the first resource; and performing the NR SL communication together with a second apparatus on the basis of the first resource, wherein the second resource may be a resource for which the E-UTRA-based SL communication is not allowed.

20 Claims, 21 Drawing Sheets

(56)  References Cited

OTHER PUBLICATIONS

Huawei et al., "Cell reselection for NR SL communication," 3GPP
TSG-RAN WG2 Meeting#105, R2-1902052, Athens, Greece, Feb.
25-Mar. 1, 2019, 5 pages.
Huawei et al., "Correction on V2X functions in TS 38.300," 3GPP
TSG-RAN WG2 Meeting #112 electronic, R2-2009404, Online,
Nov. 2-13, 2020, 8 pages.
Search Report and Written Opinion in International Appln. No.
PCT/KR2021/017011, mailed on Feb. 21, 2022, 6 pages(with
English translation).

* cited by examiner

FIG. 1

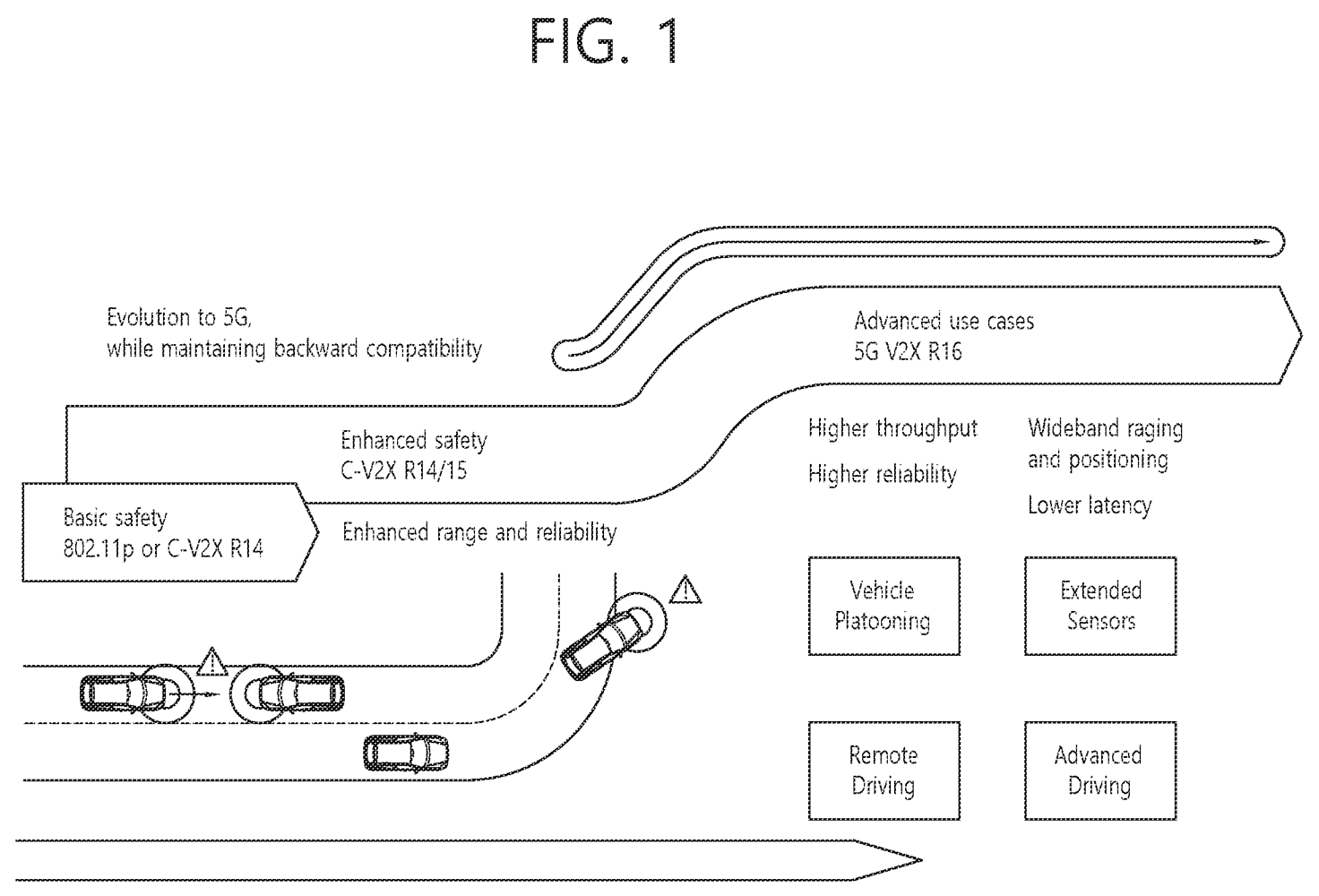

Evolution to 5G,
while maintaining backward compatibility

Advanced use cases
5G V2X R16

Wideband raging
and positioning

Lower latency

Higher throughput

Higher reliability

Enhanced safety
C-V2X R14/15

Enhanced range and reliability

Basic safety
802.11p or C-V2X R14

| Vehicle Platooning | Extended Sensors |
| Remote Driving | Advanced Driving |

FIG. 3

BS(e.g. eNB or gNB)

UE 1                             UE 2

(a)                 (b)

(a)                    (b)                    (c)

● : TX UE

⊘ : RX UE

Figure 14:
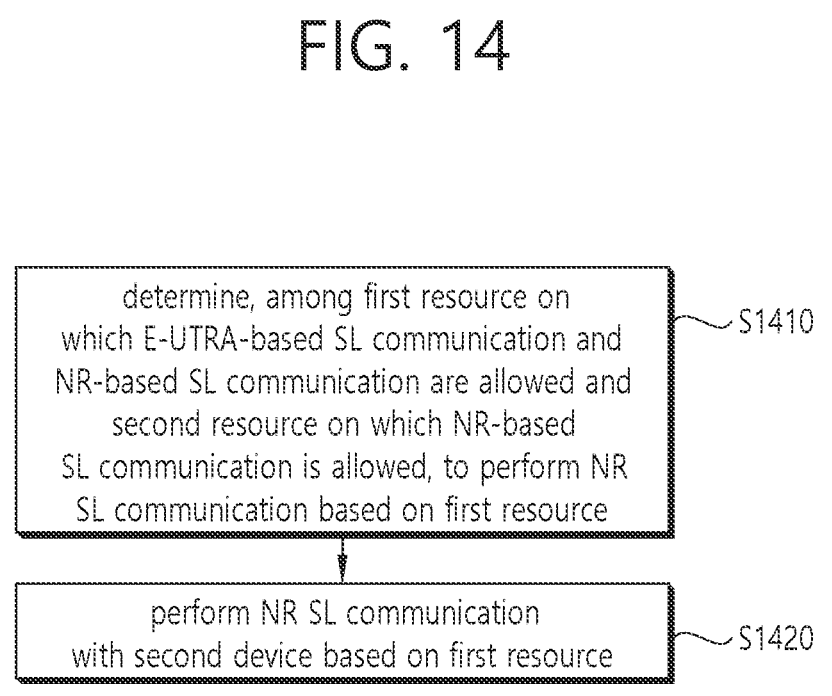

FIG. 14 determine, among first resource on
which E-UTRA-based SL communication and
NR-based SL communication are allowed and
second resource on which NR-based
SL communication is allowed, to perform NR
SL communication based on first resource ~S1410 perform NR SL communication
with second device based on first resource ~S1420

FIG. 16

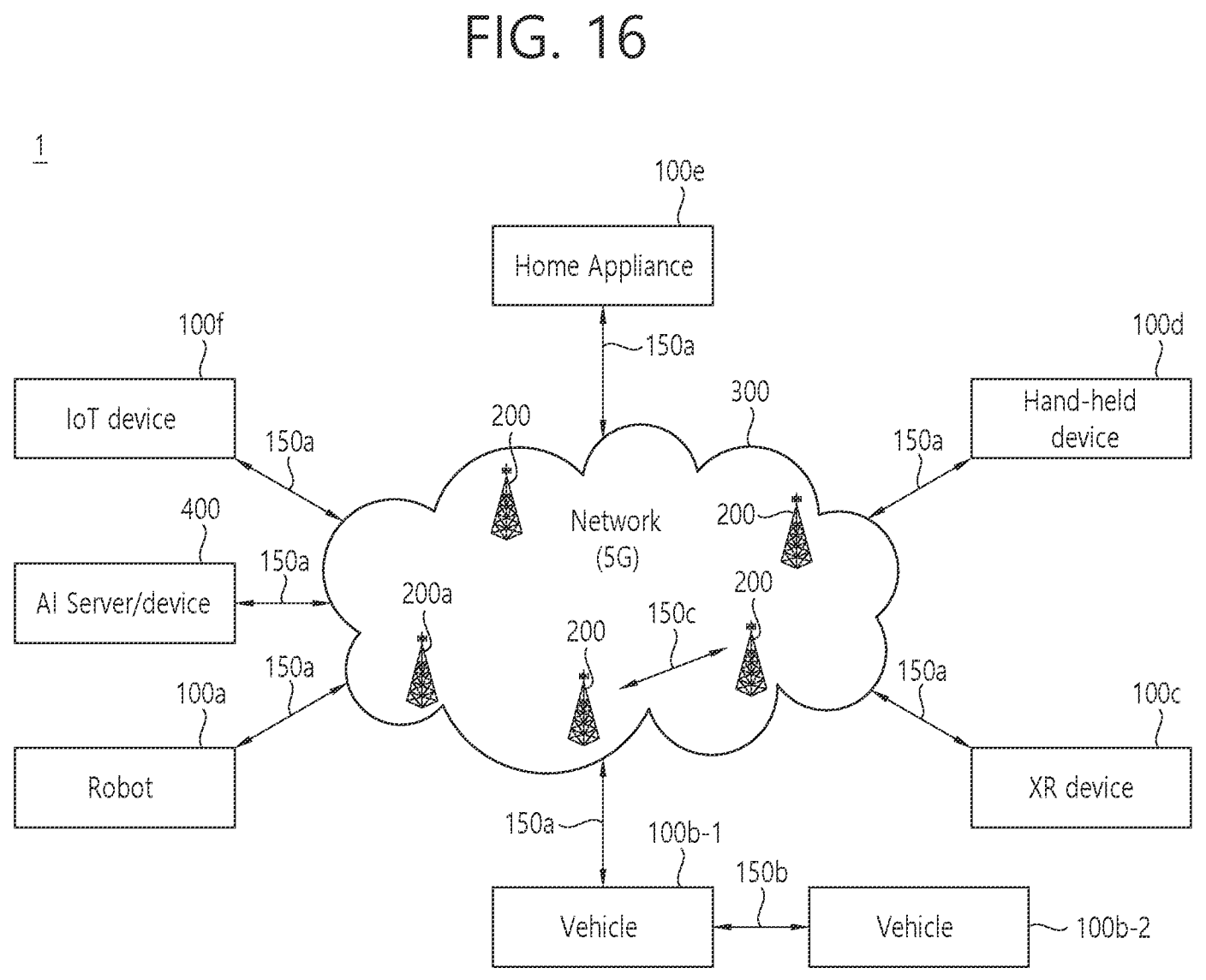

Hand-held device 100d

XR device 100c

Vehicle 100b-2

Home Appliance 100e

Network (5G) 300

IoT device 100f

AI Server/device 400

Robot 100a

Vehicle 100b-1

Figure 19:
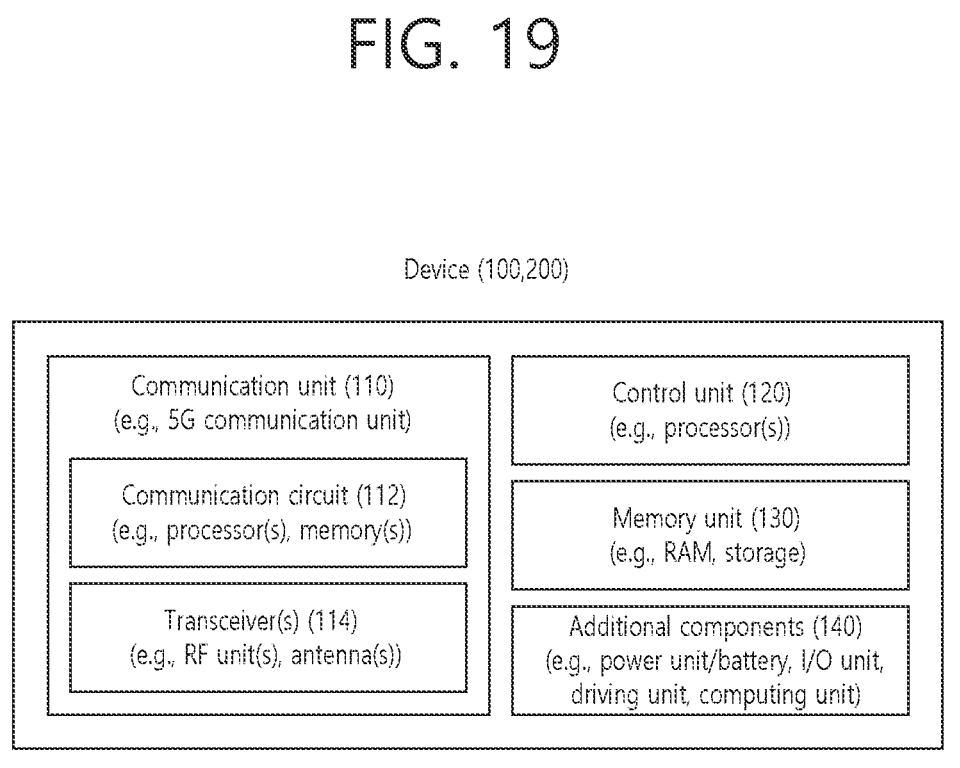

Device (100,200)

| Communication unit (110)<br>(e.g., 5G communication unit) | Control unit (120)<br>(e.g., processor(s)) |
|---|---|
| Communication circuit (112)<br>(e.g., processor(s), memory(s)) | Memory unit (130)<br>(e.g., RAM, storage) |
| Transceiver(s) (114)<br>(e.g., RF unit(s), antenna(s)) | Additional components (140)<br>(e.g., power unit/battery, I/O unit,<br>driving unit, computing unit) |

METHOD AND APPARATUS BY WHICH LTE V2X AND NR V2X COEXIST IN SAME FREQUENCY BAND

CROSS-REFERENCE TO RELATED APPLICATIONS

This application is a National Stage application under 35 U.S.C. § 371 of International Application No. PCT/KR2021/017011, filed on Nov. 18, 2021, which claims the benefit of Korean Patent Application No. 10-2020-0156960, filed on Nov. 20, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, there may be a case where the same frequency band needs to be shared by multiple different radio access technologies. For example, LTE-V2X and NR-V2X may need to coexist while sharing the same vehicle communication frequency band (e.g., the 5.9 GHz ITS band). Meanwhile, whereas LTE-V2X (LTE-SL) mainly supports basic vehicle safety services, NR-V2X (NR-SL) may support more advanced vehicle communication services. In this case, the advanced vehicular communication services mainly require low latency/high reliability and high data rates. Therefore, in order to support these services in NR-V2X (NR-SL), it is required to secure more (time and/or frequency) transmission resources (compared to LTE-V2X (LTE-SL)). However, since transmission resources are limited, a method for efficiently coexisting two different types of communication technologies on limited resources and a device supporting the method are required.

In one embodiment, provided is a method for performing wireless communication by a first device. The method may comprise: determining, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource; and performing the NR SL communication with a second device based on the first resource, wherein the second resource is a resource on which the E-UTRA-based SL communication is not allowed.

In one embodiment, provided is a first device adapted to perform wireless communication. The first device may comprise: one or more memories storing instructions; one or more transceivers; and one or more processors connected to the one or more memories and the one or more transceivers. The one or more processors may execute the instructions to: determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource; and perform the NR SL communication with a second device based on the first resource, wherein the second resource is a resource on which the E-UTRA-based SL communication is not allowed.

Since LTE V2X and NR V2X can coexist in the same frequency band, limited radio resources can be used efficiently.

BRIEF DESCRIPTION OF THE DRAWINGS

FIG. 1 is a drawing for describing V2X communication based on NR, compared to V2X communication based on RAT used before NR.

FIG. 3 shows a radio protocol architecture, based on an embodiment of the present disclosure.

FIG. 14 shows a method for performing wireless communication by a first device, based on an embodiment of the present disclosure.

FIG. 16 shows a communication system 1, based on an embodiment of the present disclosure.

FIG. 19 shows another example of a wireless device, based on an embodiment of the present disclosure.

DETAILED DESCRIPTION

Figure 2:
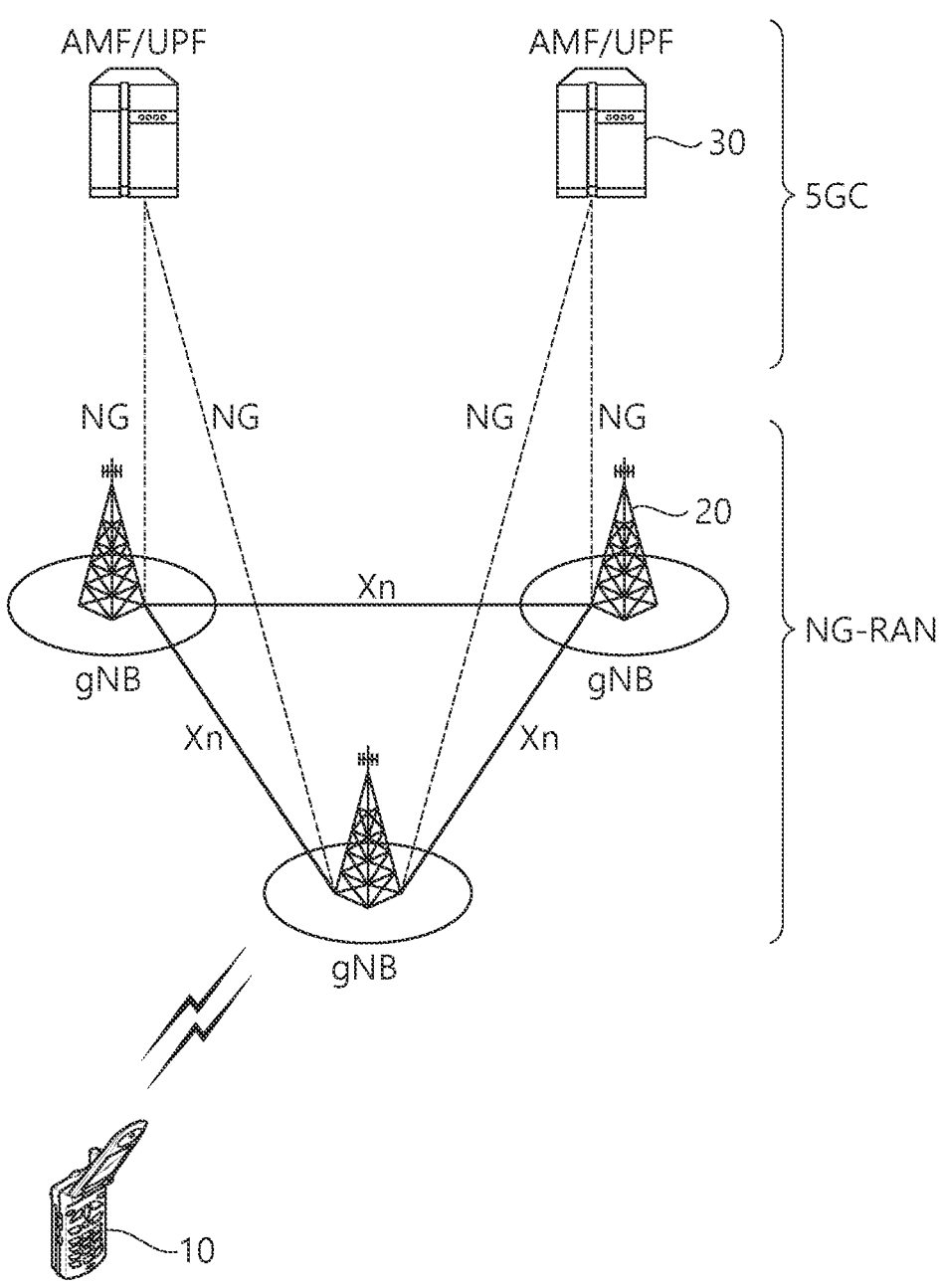
FIG. 2 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
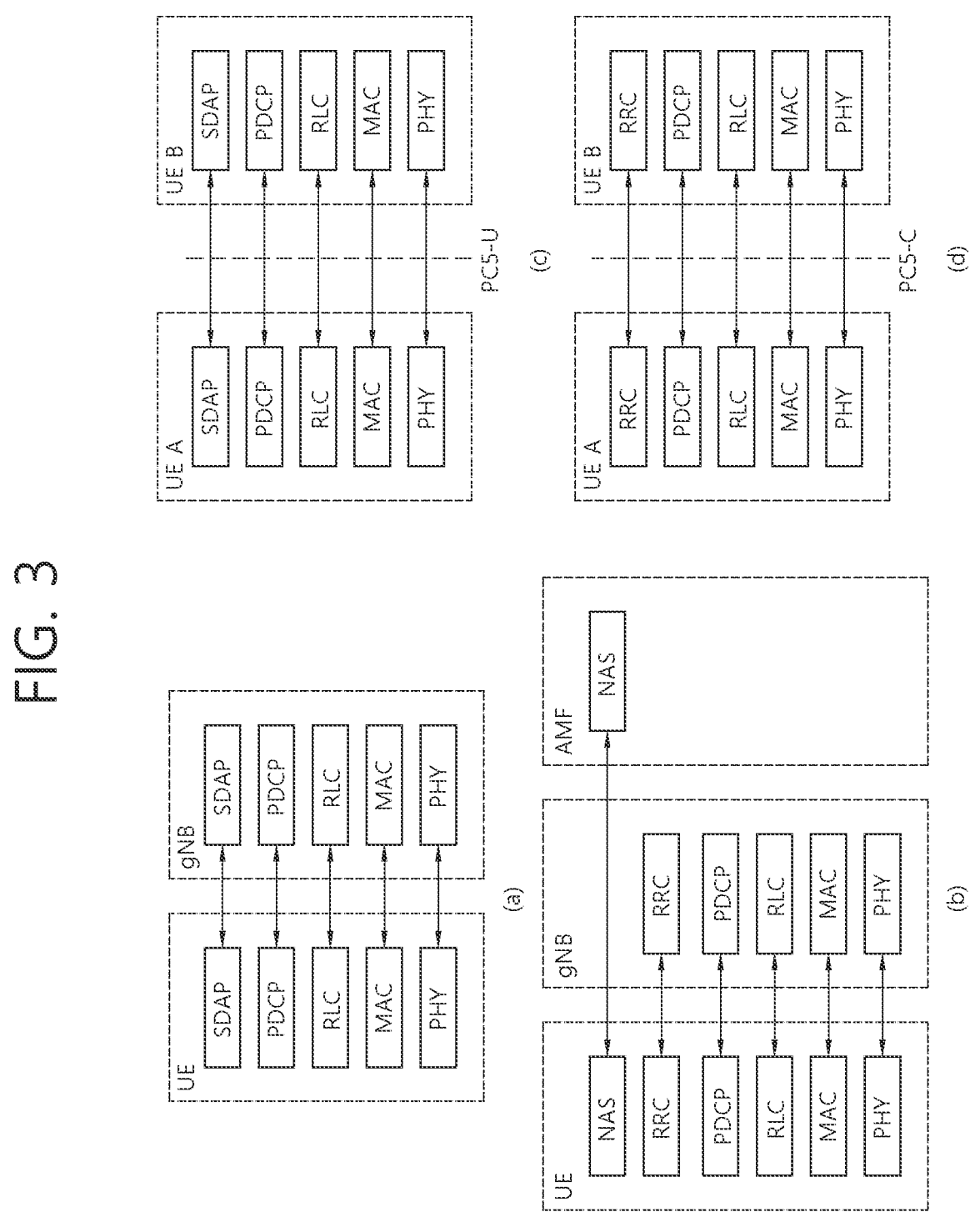

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for speci-fying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its con-nection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control mes-sages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher chan-nel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
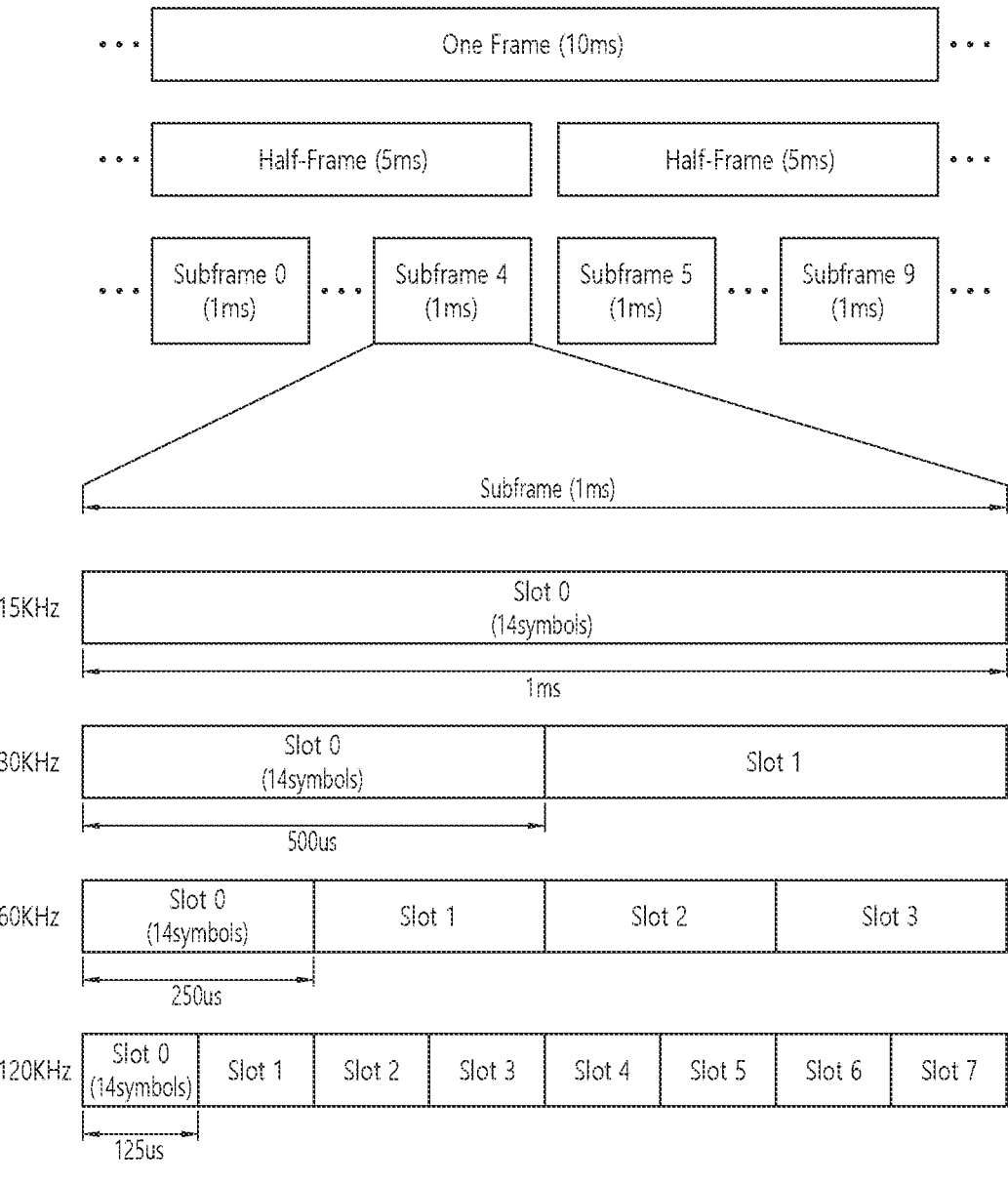
FIG. 4 shows a structure of a radio frame of an NR, based on an embodiment of the present disclosure.

FIG. 4 shows a structure of a radio frame of an NR, based on an embodiment of the present disclosure. The embodi-ment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Trans-form-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used. PGP-21T

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
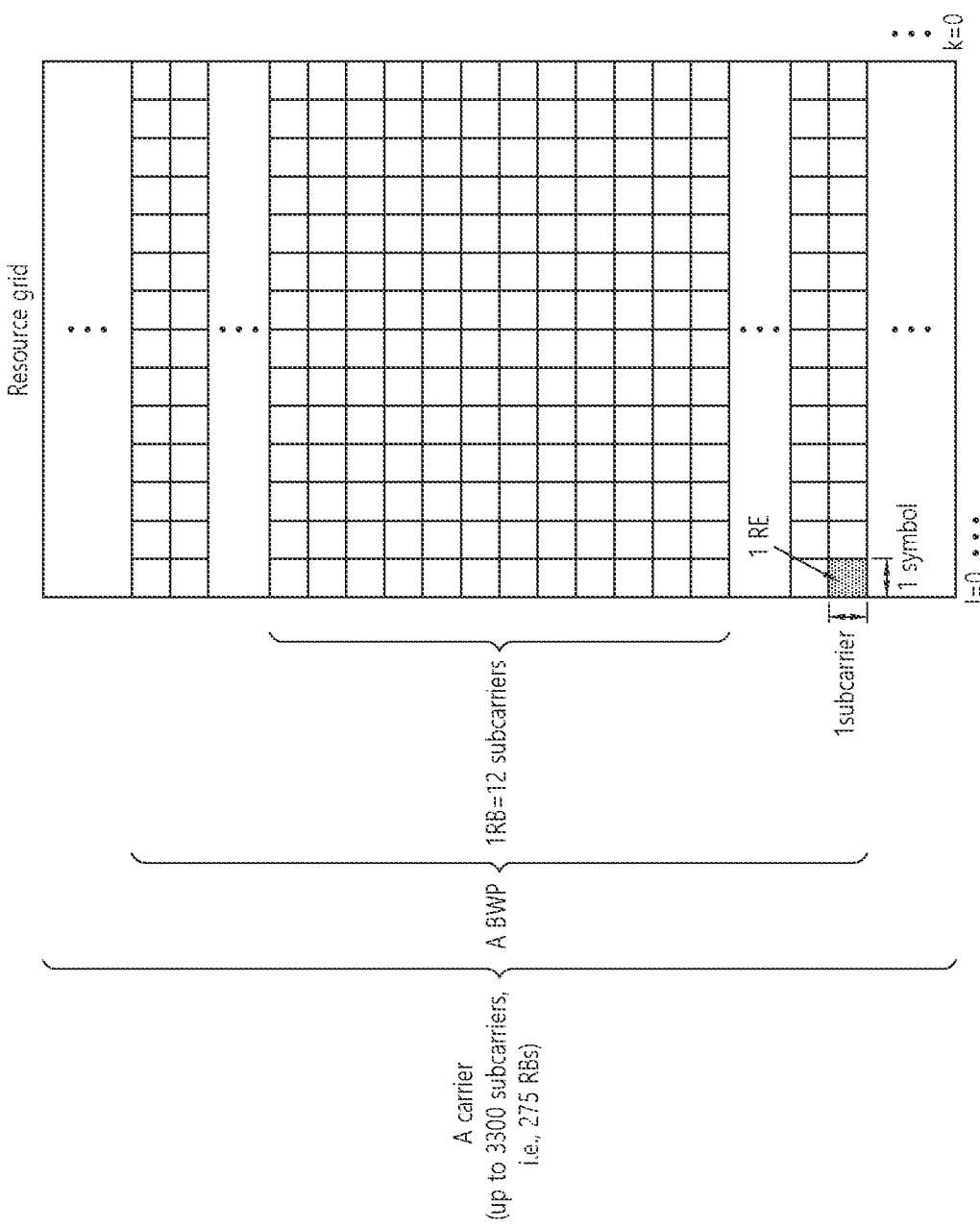
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
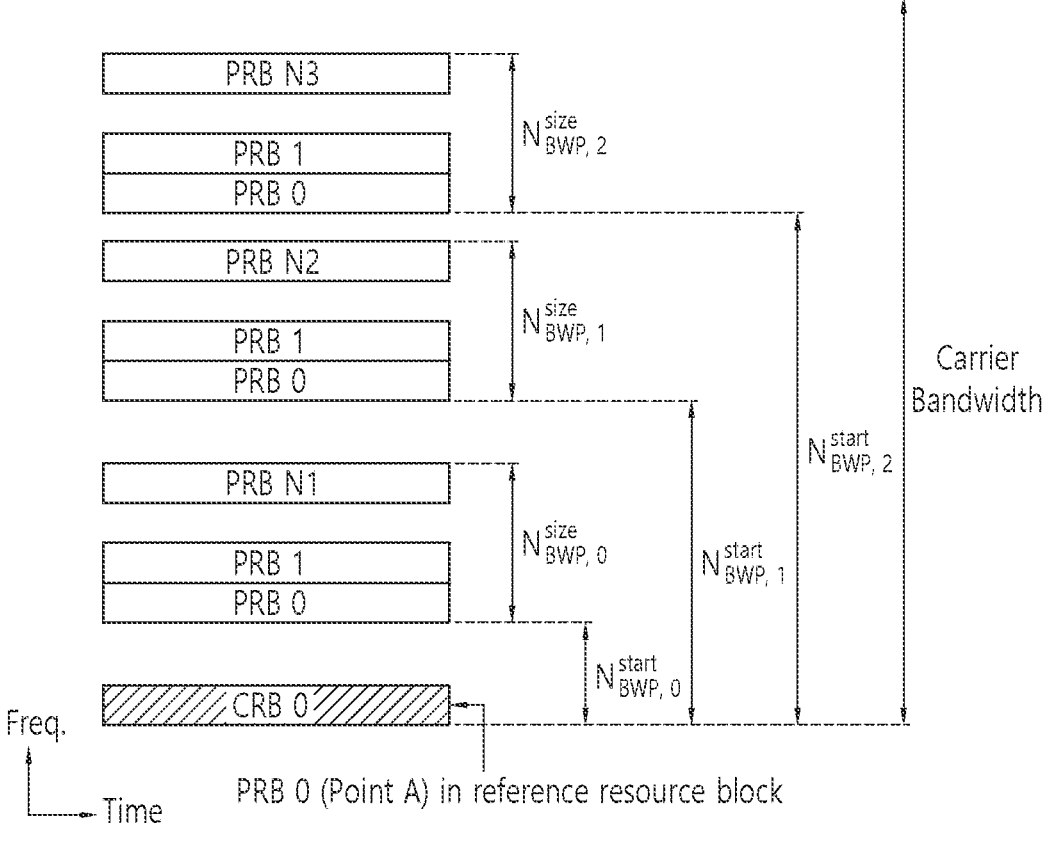
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described. A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
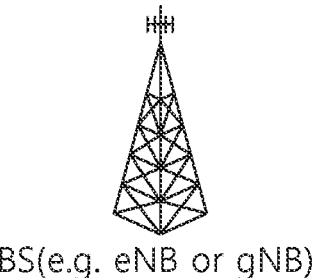
FIG. 7 shows a UE performing V2X or SL communication, based on an embodiment of the present disclosure.
Figure 7:

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
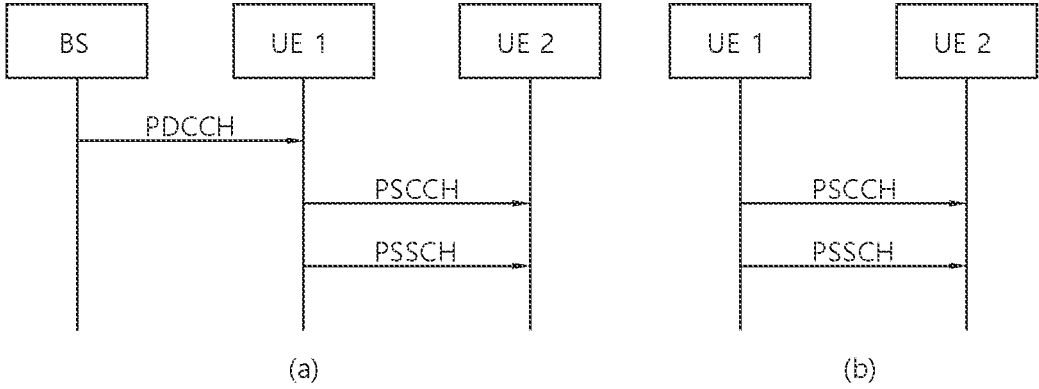
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
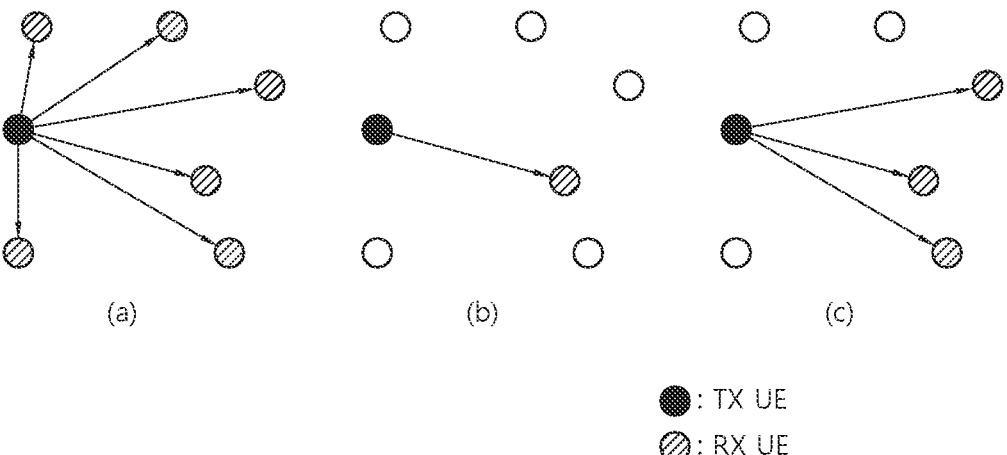
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
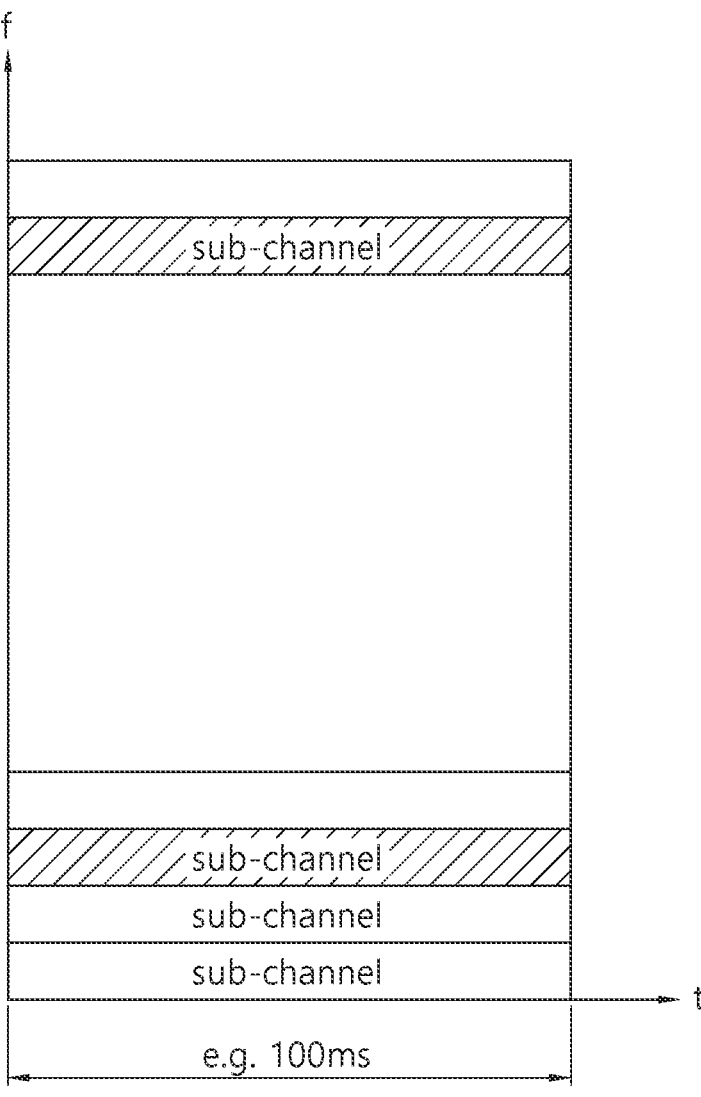
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

Hereinafter, in-device coexistent of LTE SL and NR SL will be described.

Figure 11:
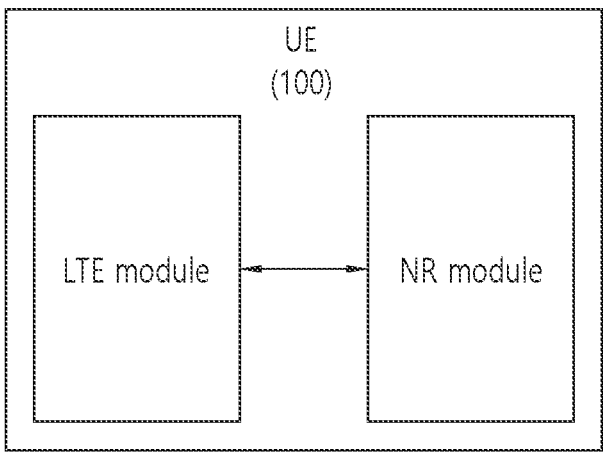
FIG. 11 shows a UE including an LTE module and an NR module based on an embodiment of the present disclosure.

FIG. 11 shows a UE including an LTE module and an NR module based on an embodiment of the present disclosure. The embodiment of FIG. 11 may be combined with various embodiments of the present disclosure.

Referring to FIG. 11, a UE may include a module related to LTE SL transmission and a module related to NR SL transmission. A packet related to LTE SL transmission generated in a higher layer may be transferred to an LTE module. A packet related to NR SL transmission generated in the higher layer may be transferred to an NR module. Herein, for example, the LTE module and the NR module may be related to a common higher layer (e.g., an application layer). Alternatively, for example, the LTE module and the NR module may be related to different higher layers (e.g., a higher layer related to the LTE module and a higher layer related to the NR module). Each packer may be related to a specific priority. In this case, the LTE module may not know a priority of a packet related to NR SL transmission, and the NR module may not know a priority of a packet related to LTE SL transmission. To compare priorities, a priority related to LTE SL transmission and a priority of a packet related to SN SL transmission may be exchanged between the LTE module and the NR module. Accordingly, the LTE module and the NR module may know a priority of a packet related to LTE SL transmission and a packet related to NR SL transmission. In addition, if the LTE SL transmission and NR SL transmission overlap, the UE may compare a priority of a packet related to LTE SL transmission and a priority of a packet related to NR SL transmission, and may perform only SL transmission related to a high priority. For example, an NR V2X priority field and a PPPP may be directly compared with each other.

For example, Table 5 shows an example of a priority of a service related to LTE SL transmission and a priority of a service related to LTE SL transmission. Although it is described based on the PPPP for convenience of explanation, the priority is not limited to the PPPP. For example, the priority may be defined in various manners. For example, the same type of common priority may be applied to an NR related service and an LTE related service.

TABLE 5

| LTE related service | PPPP value | NR related service | PPPP value |
|---|---|---|---|
| LTE SL service A | 1 | NR SL service D | 1 |
| LTE SL service B | 2 | NR SL service E | 2 |
| LTE SL service C | 3 | NR SL service F | 3 |

For example, in the embodiment of Table 5, it is assumed that the UE determines to transmit an LTE SL service A and an NR SL service E, and transmission for the LTE SL service A and transmission for the NR SL service E overlap. For example, the transmission for the LTE SL service A and the transmission for the NR SL service E may partially or entirely overlap on a time domain. In this case, the UE may perform only SL transmission related to a high priority, and may omit SL transmission related to a low priority. For example, the UE may transmit only the LTE SL service A on a first carrier and/or a first channel. Otherwise, the UE may not transmit the NR SL service E on a second carrier and/or a second channel.

Figure 12:
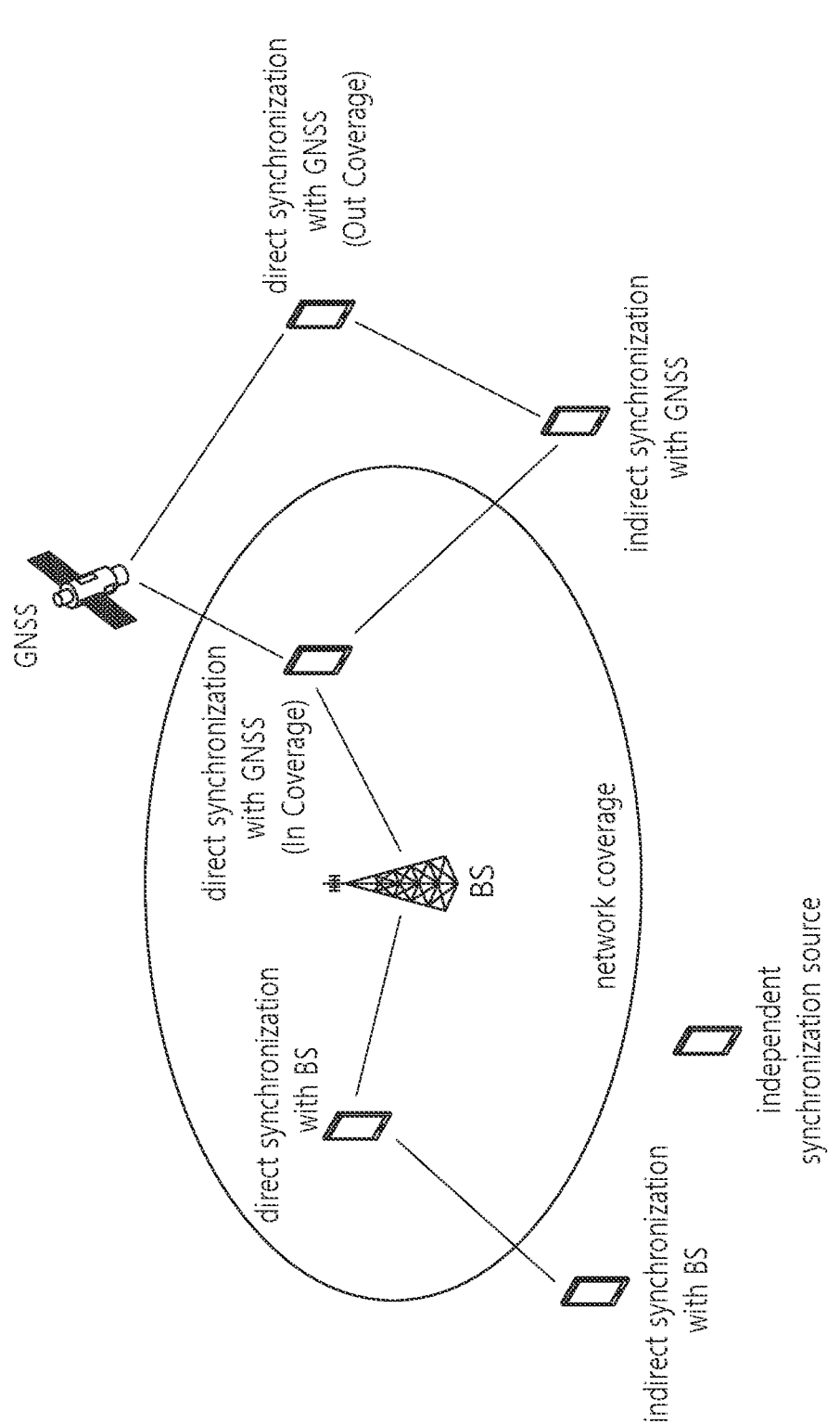
FIG. 12 shows a synchronization source or synchronization reference of V2X based on an embodiment of the present disclosure.

FIG. 12 shows a synchronization source or synchronization reference of V2X based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 6 or Table 7. Table 6 or Table 7 are for exemplary purposes only, and the relation between the synchronization source and the synchronization priority may be defined in various forms.

TABLE 6

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 7

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 6 or Table 7, PO may denote a highest priority, and P6 may denote a lowest priority. In Table 6 or Table 7, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, there may be a case where the same frequency band needs to be shared by multiple different radio access technologies. For example, LTE-V2X and NR-V2X may need to coexist while sharing the same vehicle communication frequency band (e.g., the 5.9 GHz ITS band). Meanwhile, whereas LTE-V2X (LTE-SL) mainly supports basic vehicle safety services, NR-V2X (NR-SL) may support more advanced vehicle communication services. In this case, the advanced vehicular communication services mainly require low latency/high reliability and high data rates. Therefore, in order to support these services in NR-V2X (NR-SL), it is required to secure more (time and/or frequency) transmission resources (compared to LTE-V2X (LTE-SL)). However, since transmission resources are limited, a method for efficiently coexisting two different types of communication technologies on limited resources and a device supporting the method are required.

Based on various embodiments of the present disclosure, in performing NR-V2X (NR-SL) communication and LTE-V2X (LTE-SL) communication, when there are a transmission resource that can be used for both technologies in common (e.g., LTE/NR SL shared resource) and a transmission resource that can only be used for a specific technology (e.g., LTE SL ONLY resource or NR SL ONLY resource), proposed are definitions of the transmission resources, conditions in which LTE/NR SL communication is allowed in the transmission resources based on two technologies, detailed UE operations when performing transmission/reception on the LTE/NR SL shared resource based on two technologies, and a device supporting the same. In this case, the transmission resource may refer to a carrier, a channel, a resource pool, a BWP, etc.

Figure 13:
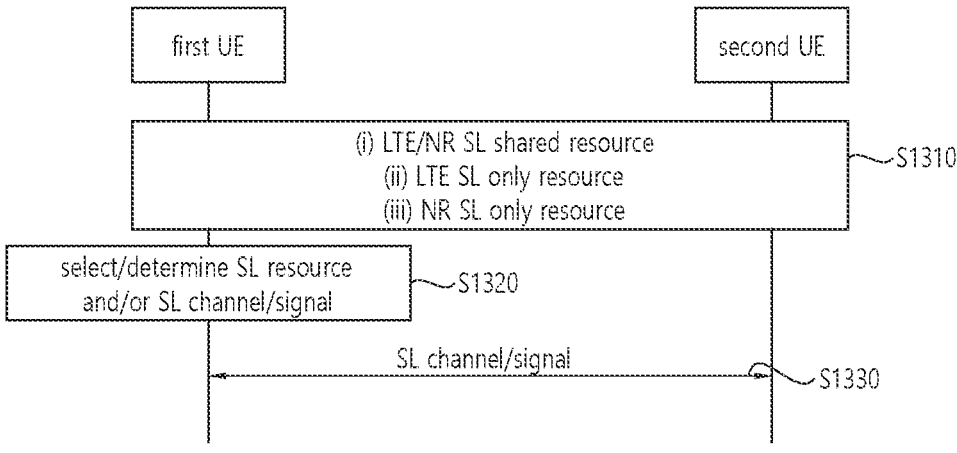
FIG. 13 shows a procedure for a UE to perform SL communication based on an LTE/NR SL shared resource, an LTE SL ONLY resource, or an NR SL ONLY resource, based on an embodiment of the present disclosure.

FIG. 13 shows a procedure for a UE to perform SL communication based on an LTE/NR SL shared resource, an LTE SL ONLY resource, or an NR SL ONLY resource, based on an embodiment of the present disclosure. The embodiment of FIG. 13 may be combined with various embodiments of the present disclosure.

Referring to FIG. 13, in step S1310, the LTE/NR SL shared resource (and/or the LTE SL ONLY resource) and the NR SL ONLY resource may be configured for a first UE and a second UE. For example, the LTE/NR SL shared resource (and/or the LTE SL ONLY resource) and the NR SL ONLY resource may be pre-configured for the first UE and the second UE. For example, a base station or a network may transmit information related to the LTE/NR SL shared resource (and/or the LTE SL ONLY resource) and information related to the NR SL ONLY resource to the first UE and the second UE. In distinguishing/defining the LTE/NR SL shared resource (and/or the LTE SL ONLY resource) and the NR SL ONLY resource, the following examples may be considered.

[CASE #A]: The case where the LTE SL ONLY resource and the NR SL ONLY resource are configured independently and a resource shared by LTE SL and NR SL exists, e.g., the case where, among frequency resources with 30 MHz, the lower resource with 10 MHz is used as the LTE SL ONLY resource, the upper resource with 10 MHz is used as the NR SL ONLY resource, and the resource with 10 MHz between them is used as the LTE/NR SL shared resource.

[CASE #B]: The case where the NR SL resource exists and the LTE SL resource exists (in the time and/or frequency domain) in the form of a subset of the NR SL resource (and/or the case where the LTE SL resource exists and the NR SL resource exists (in the time and/or frequency domain) in the form of a subset of the LTE SL resource), e.g., the case where there are frequency resources with 30 MHz for NR SL and the lowermost resource with 10 MHz of the frequency resources is used as a resource for LTE SL.

[CASE #C]: The case where LTE SL and NR SL coexist on the same resource, e.g., the case where LTE SL and NR SL coexist within a single resource (e.g., a resource pool).

For example, in the present disclosure, a resource may be interpreted as (extended to) at least one of a carrier, a channel, a resource pool, and/or a BWP.

For example, in the present disclosure, the term "configured/configuration" may be interpreted as (extended to) a form in which a base station transmits information related to the "configuration" to a UE through a pre-configured signal (e.g., SIB, RRC). For example, in the present disclosure, the term "configured/configuration" may be interpreted as (extended to) a form in which a UE obtains information related to the "configuration" through pre-configuration. For example, in the present disclosure, the term "configured/configuration" may be interpreted as (extended to) a form in which a UE obtains information related to the "configuration" from another UE (through PC5 RRC signaling and/or SL MAC CE).

For example, whether to apply the proposed rule(s) of the present disclosure and/or the related parameter(s) may be independently (or limitedly/specifically) configured for at least one of a resource pool, a service type, a service priority, a (service-related) QoS requirement (e.g., latency, reliability), a congestion level (within a resource pool), a periodic resource reservation method, an aperiodic resource reservation method, a cast type (e.g., broadcast, groupcast, unicast), MAC PDU/TB transmission with HARQ feedback enabled, MAC PDU/TB transmission with HARQ feedback disabled, NR-based SL communication, LTE-based SL communication, and/or an SL resource allocation mode (e.g., mode 1, mode 2).

In step S1320, the first UE may select/determine an SL resource and/or an SL channel/signal, based on the method(s) and/or the condition(s) proposed in various embodiments of the present disclosure.

In step S1330, the first UE may transmit/receive the SL channel/signal to/from the second UE, based on the method(s) and/or the condition(s) proposed in various embodiments of the present disclosure.

Based on an embodiment of the present disclosure, if a pre-configured condition (hereinafter, COEX_CON) is satisfied, transmission (and/or reception) of only a pre-configured NR SL channel/signal may be allowed on the LTE/NR SL shared resource (and/or the LTE SL ONLY resource). For example, if COEX_CON is satisfied, the UE may be allowed to transmit (and/or receive) only the pre-configured NR SL channel/signal on the LTE/NR SL shared resource (and/or the LTE SL ONLY resource). Herein, for example, the NR SL channel/signal may be configured as an NR PSSCH. For example, the NR SL channel/signal may be configured as at least one of an NR PSSCH, an NR PSCCH, an NR S-SSB, and/or an NR PSFCH. Herein, for example, NR SL packet/message transmission (and/or S-SSB transmission and/or PSFCH transmission) performed on the LTE/NR SL shared resource (and/or the LTE SL ONLY resource) may be configured to be performed based on a form of an NR SL format. For example, NR SL packet/message transmission (and/or S-SSB transmission and/or PSFCH transmission) performed on the LTE/NR SL shared resource (and/or the LTE SL ONLY resource) may be configured to be performed based on a form of an LTE SL format. In this case, PSFCH transmission on the LTE/NR SL shared resource may be allowed only in a situation in which a resource for PSFCH transmission (as well as resources for an NR PSCCH and/or an NR PSSCH) can be secured. In the case of NR SL, if a PSCCH/PSSCH transmission resource is not occupied, the corresponding PSFCH resource is also not occupied, but an LTE UE cannot anticipate the behavior of an NR UE. Therefore, the above behavior can be interpreted as a behavior to protect the LTE UE present in the corresponding resource.

For example, transmission (and/or reception) of a pre-configured NR SL channel/signal may be configured to be allowed only on the NR SL ONLY resource. For example, the UE may be allowed to transmit (and/or receive) the pre-configured NR SL channel/signal only on the NR SL ONLY resource. Herein, for example, the NR SL channel/signal may be configured as an NR PSFCH. For example, the NR SL channel/signal may be configured as at least one of an NR PSFCH, an NR S-SSB, an NR PSCCH, and/or an NR PSSCH.

For example, transmission (and/or reception) (and/or measurement/derivation) of pre-configured NR SL information may be configured to be allowed only on the NR SL ONLY resource. For example, the UE may be allowed to transmit (and/or receive) (and/or measure/derive) the pre-configured NR SL information only on the NR SL ONLY resource. Herein, for example, the NR SL information may be configured as NR SL CSI and/or NR SL RSRP reporting. For example, for the LTE/NR SL shared resource (and/or the LTE SL ONLY resource) and the NR SL ONLY resource, the UE may be configured to perform NR SL CSI and/or NR SL RSRP measurement/derivation operations (and/or NR SL CSI-RS transmission (and/or reception) operations) independently.

Based on an embodiment of the present disclosure, if COEX_CON is satisfied, only NR SL transmission (and/or reception) that satisfy (some or all of) the conditions below may be allowed on the LTE/NR SL shared resource (and/or the LTE SL ONLY resource). For example, if COEX_CON is satisfied, the UE may be allowed to perform only NR SL transmission (and/or reception) that satisfy (some or all of) the conditions below on the LTE/NR SL shared resource (and/or the LTE SL ONLY resource).

A packet related to a service with a latency requirement higher than a pre-configured threshold A packet related to a service with a latency requirement lower than a pre-configured threshold A packet related to a service with a reliability requirement lower than a pre-configured threshold A packet related to a service with a reliability requirement higher than a pre-configured threshold A packet related to a service with a priority lower than a pre-configured threshold A packet related to a service with a priority higher than a pre-configured threshold NR (TB-related) retransmission NR (TB-related) initial transmission For example, if the UE transmits/receives a message on the LTE/NR SL shared resource, there may be performance degradation related to latency and reliability. Therefore, it may be advantageous for the UE to avoid using such resources (i.e., the LTE/NR SL shared resource (and/or the LTE SL ONLY resource)) for transmission/reception of messages requiring high QoS as much as possible.

For example, both NR TB-related initial transmission and retransmission may be performed on the NR SL ONLY resource. For example, both NR TB-related initial transmission and retransmission may be performed on the LTE/NR SL shared resource. For example, the UE may perform initial transmission on the NR SL ONLY resource, and the UE may perform retransmission on the LTE/NR SL shared resource. For example, the UE may perform initial transmission on the LTE/NR SL shared resource, and the UE may perform retransmission on the NR SL ONLY resource.

Based on an embodiment of the present disclosure, NR SL transmission (and/or reception) performed on the LTE/NR SL shared resource (and/or the LTE SL ONLY resource) may be configured to be performed in units of (a pre-configured number of) TBs (and/or NR SL HARQ process ID and/or booking/reservation process). For example, switching of NR transmission (and/or reception) between the NR SL ONLY resource and the LTE/NR SL shared resource (and/or the LTE SL ONLY resource) may be configured to be performed in units of (a pre-configured number of) TBs (and/or NR SL HARQ process ID and/or booking/reservation process). If the rule is applied, it may be interpreted that if TB-related transmission (and/or reception) is performed on a particular type of resource, then that particular type of resource may be limitedly used until the TB-related transmission (and/or reception) operation is completed/successful. For example, if the UE performs TB-related transmission (and/or reception) on a particular type of resource, the UE may be limited to using only that particular type of resource until the UE completes/successes the TB-related transmission (and/or reception).

Based on an embodiment of the present disclosure, in a situation where the NR SL ONLY resource and the LTE/NR SL shared resource exist, such as in CASE #A (and/or CASE

B), the NR SL transmission (and/or reception) operation may be configured to be performed according to (some of) the rules below. For example, the UE may perform NR SL transmission (and/or reception) according to (some of) the rules below.

For example, if the UE performs NR transmission by using both the NR SL ONLY resource and the LTE/NR SL shared resource simultaneously, the UE performing NR transmission on the NR SL ONLY resource may be configured to configure scheduling information in SCI transmitted on the NR SL ONLY resource based on parameters related to the resource (e.g., number/size of subchannels, number of slots that can be signaled with one SCI, etc.). On the other hand, for example, the UE performing NR transmission on the LTE/NR SL shared resource may be configured to configure scheduling information in SCI transmitted on the LTE/NR SL shared resource based on parameters related to the LTE/NR SL shared resource (and/or the NR SL ONLY resource). On the NR SL ONLY resource, legacy NR UEs (not optimized for the LTE/NR coexistence operation in the same band) and UEs supporting the LTE/NR coexistence operation proposed in the present disclosure (i.e., advanced NR UEs) may coexist and perform message transmission/reception. Accordingly, when the advanced NR UE performs the above proposed operation on the NR SL ONLY resource, the advanced NR UE may perform the transmission/reception operation using the legacy NR SL signal format/structure (which can be decoded by the legacy NR UE) in order to protect the operation/performance of the legacy NR UE performing transmission/reception on the corresponding resource. Meanwhile, on the LTE/NR SL shared resource, the advanced NR UE (and/or the legacy NR UE) may be configured to use a parameter (e.g., number/size of subchannels, number of slots that can be signaled with one SCI, etc.) and/or an SCI format (and/or a configuration of scheduling information on SCI) different from that used on the NR SL ONLY resource. Herein, the parameter and/or the SCI format (and/or the configuration of scheduling information in SCI) may be configured as a parameter/format that can be decoded only by the advanced NR UE (and cannot be decoded by the legacy NR UE and/or the LTE UE). Further, when advanced NR UEs perform transmission/reception using different parameters (or the same parameter) (e.g., number/size of sub-channels, number of slots that can be signaled with one SCI, etc.) and/or SCI formats (and/or configurations of scheduling information in SCI), the UE may have the capability of simultaneous transmission on the LTE/NR SL shared resource (and/or the LTE SL ONLY resource) and the NR SL ONLY resource, and may perform FDM/TDM transmission on the LTE/NR SL shared resource (and/or the LTE SL ONLY resource) and the NR SL ONLY resource.

Based on an embodiment of the present disclosure, in the case of a guard band (hereinafter, LTE-GB) related to an LTE SL resource (e.g., in particular, when LTE-GB is included on an NR SL resource), if COEX_CON is satisfied, the UE may be configured to use the corresponding guard band for NR SL transmission (and/or reception). Herein, for example, in determining whether COEX_CON is satisfied in LTE-GB, thresholds for each parameter (e.g., S-RSSI, PSSCH/PSCCH DMRS RSRP, CBR, etc.) in rules #1 to #5 of COEX_CON may be configured independently compared to a case where NR SL communication is performed on the LTE ONLY resource and/or the NR ONLY resource. For example, in determining whether COEX_CON is satisfied in LTE-GB, thresholds for each parameter (e.g., S-RSSI, PSSCH/PSCCH DMRS RSRP, CBR, etc.) in rules #1 to #5 of COEX_CON may be configured differently compared to a case where NR SL communication is performed on the LTE ONLY resource and/or the NR ONLY resource. For example, in determining whether COEX_CON is satisfied in LTE-GB, thresholds for each parameter (e.g., S-RSSI, PSSCH/PSCCH DMRS RSRP, CBR, etc.) in rules #1 to #5 of COEX_CON may be configured the same as compared to a case where NR SL communication is performed on the LTE ONLY resource and/or the NR ONLY resource.

Based on an embodiment of the present disclosure, when the UE performs NR SL transmission (and/or reception) on the LTE/NR SL shared resource (and/or the LTE SL ONLY resource), the UE may be configured to perform the transmission (and/or the reception) based on at least one of parameters, LTE PHY structure units (e.g., SCS, CP length), and/or LTE numerology. For example, when the UE performs NR SL transmission (and/or reception) on the LTE/NR SL shared resource (and/or the LTE SL ONLY resource), the UE may be configured to perform the transmission (and/or the reception) based on at least one of parameters, NR PHY structure units (e.g., SCS, CP length), and/or NR numerology (used on the NR ONLY resource). Herein, for example, if SCS related to NR SL is 30 kHz, it may be interpreted that two associated transmissions (and/or receptions) is performed as a single batch within an LTE subframe with 1 msec. For example, if SCS related to NR SL is 30 kHz, it may be interpreted that two associated transmissions (and/or receptions) are considered as a single batch, and the UE performs AGC using only an AGC symbol included in the first slot within the LTE subframe with 1 msec. For example, NR SL transmission (and/or reception) performed on the LTE/NR SL shared resource (and/or the LTE SL ONLY resource) may be limited to a pre-configured number of antenna ports (APs) (e.g., 1) (and/or transmission techniques (e.g., NO TX diversity/space frequency block coding (SFBC)). For example, NR transmission (and/or reception) performed on the LTE/NR SL shared resource (and/or the LTE SL ONLY resource) may be limited to periodic (and/or aperiodic) resource reservation scheme.

Based on an embodiment of the present disclosure, for the LTE/NR SL shared resource (and/or the LTE SL ONLY resource) and the NR SL ONLY resource, the UE may be configured to perform CBR (and/or CR) measurement/derivation operations independently. For example, if the rule is applied, it may be interpreted that congestion control operations are performed/applied independently for different types of resources. For example, for the LTE/NR SL shared resource (and/or the LTE SL ONLY resource) and the NR SL ONLY resource, the UE may be configured to perform merged/integrated CBR (and/or CR) measurement/derivation operations.

Based on an embodiment of the present disclosure, when the UE performs an NR SL channel/signal transmission operation (and/or a sensing operation) on the LTE/NR SL shared resource (and/or the LTE SL ONLY resource), if the UE detects LTE SL channel/signal transmission (satisfying condition(s) described below (e.g., COEX_CON)), the UE may be configured to follow (some or all of) the rules below.

For example, the UE may reselect (and/or transmit) only resources (and/or SL grants related to NR SL channel/signal transmission) for NR SL channel/signal transmission that overlaps with LTE SL channel/signal transmission on the LTE/NR SL shared resource (and/or the LTE SL ONLY resource) (or the NR SL ONLY resource), and/or For example, the UE may perform NR SL channel/signal transmission and related resource (re)selection on the NR SL ONLY resource (after changing/switching from the LTE/NR SL shared resource (and/or the LTE SL ONLY resource) to the NR SL ONLY resource), and/or For example, the UE may exclude a time resource domain (e.g., subframe) (and/or only time and frequency resource domain) in which LTE SL channel/signal transmission exists, from candidate resources available for selection for NR SL channel/signal transmission.

Based on an embodiment of the present disclosure, the UE may be allowed to transmit (and/or receive) an NR SL channel/signal on the LTE/NR SL shared resource (and/or the LTE SL ONLY resource) only if (some or all of) COEX_CON below is satisfied. Herein, for example, if the rule is applied, the UE may transmit (and/or receive) an NR SL channel/signal using only the NR SL ONLY resource (or falling back to the NR SL ONLY resource) if COEX_CON is not satisfied. For example, COEX_CON may include at least one of rules #1 to #5. For example, on the LTE/NR SL shared resource (and/or the LTE SL ONLY resource), the rule described below may not be applied. Specifically, for example, on the LTE/NR SL shared resource (and/or the LTE SL ONLY resource), the UE may be configured to perform a sensing operation based on an LTE SL method to select/reserve resources for NR SL channel/signal transmission, and to handle overlap between the resources for NR SL channel/signal transmission and resources for LTE SL channel/signal transmission based on (NR) pre-emption (and/or re-evaluation) operations. Herein, for example, an SL RSRP threshold (and/or a priority threshold) used for the (NR) pre-emption (and/or re-evaluation) may be configured independently compared to a case where NR SL communication is performed on the NR SL ONLY resource. For example, an SL RSRP threshold (and/or a priority threshold) used for the (NR) pre-emption (and/or re-evaluation) may be configured differently compared to a case where NR SL communication is performed on the NR SL ONLY resource. For example, an SL RSRP threshold (and/or a priority threshold) used for the (NR) pre-emption (and/or re-evaluation) may be configured to be the same compared to a case where NR SL communication is performed on the NR SL ONLY resource.

(Rule #1) If an S-RSSI measurement value (within a pre-configured (separate) time window/number of slots) is lower than a pre-configured threshold, and/or (Rule #2) If LTE SL channel/signal transmission with a PSSCH DMRS RSRP measurement value (and/or NR SL channel/signal transmission with a PSSCH (and/or PSCCH) DMRS RSRP measurement value) (based on PSCCH decoding) higher than a pre-configured threshold is not detected (within a pre-configured (separate) time window/number of slots), and/or (Rule #3) If an LTE SL channel/signal (and/or an NR SL channel/signal) with a priority higher than a pre-configured threshold is not detected (within a pre-configured (separate) time window/number of slots), and/or (Rule #4) If a measured CBR value within a resource pool (within a pre-configured (separate) time window/number of slots) is less than a pre-configured threshold, and/or (Rule #5) If the UE intends to transmit a TB for which SL HARQ feedback is enabled through an NR PSCCH/PSSCH, and if the rule described above (e.g., Rule #2 and/or Rule #3) is satisfied on an NR PSFCH resource associated with the NR PSCCH/PSSCH (and/or on resources from the NR PSCCH/PSSCH resource to the associated NR PSFCH resource).

Herein, for example, the UE may be configured to perform (additional) transmission (of pre-configured information (e.g., dummy information, previously transmitted associated TB information)) on the NR PSCCH/PSSCH resource within a slot in which the NR PSFCH resource is configured.

Based on an embodiment of the present disclosure, the (NR mode 1) UE may be configured to report to the base station, through a predefined channel/signal (e.g., PUSCH, PUCCH, MAC CE), information related to sensing results (on LTE SL channels/signals) on the LTE/NR SL shared resource (and/or the LTE SL ONLY resource) (and/or information related to CBR measurements (for a resource pool)). For example, as in the above-described embodiment, if the UE can perform CBR (and/or CR) measurement/derivation operations independently (or merged/integrated CBR (and/or CR) measurement/derivation operations) for the LTE/NR SL shared resource (and/or the LTE SL ONLY resource) and the NR SL ONLY resource, the UE may be configured to report to the base station, through a predefined channel/signal (e.g., PUSCH, PUCCH, MAC CE), information related to multiple CBR measurements (for each resource pool of individual resources) (measured/derived from the LTE/NR SL shared resource and/or the LTE SL ONLY resource and/or the NR SL ONLY resource), or the UE may be configured to report a merged/aggregated CBR value (measured/derived from the LTE/NR SL shared resource and/or the LTE SL ONLY resource and/or the NR SL ONLY resource).

Based on an embodiment of the present disclosure, if the UE is not capable of performing simultaneous transmission/reception operations (and/or simultaneous transmission operations and/or simultaneous reception operations) of NR SL and LTE SL (on different frequency resources), a time domain may be configured in which the UE prioritizes reception (and/or transmission) operations on the LTE/NR SL shared resource (and/or the LTE SL ONLY resource) over transmission (and/or reception) operations of NR SL channels/signals on the NR SL ONLY resource. This may be for the purpose of ensuring a certain level of sensing behavior for the UE, for example, to reduce interference to LTE SL channel/signal communication on the LTE/NR SL shared resource (and/or the LTE SL ONLY resource).

Based on an embodiment of the present disclosure, the UE may be synchronized to the same synchronization reference/source (or different synchronization references/sources) for the LTE/NR SL shared resource (and/or the LTE SL ONLY resource) and the NR SL ONLY resource, and the UE may transmit (and/or receive) NR SL channels/signals based on the synchronization.

For example, the UE may synchronize to an LTE synchronization reference for the LTE/NR SL shared resource (and/or the LTE SL ONLY resource), and the UE may transmit (and/or receive) NR SL channels/signals based on the synchronization. On the other hand, for example, the UE may synchronize to an NR synchronization reference that is different from the LTE synchronization reference for the NR SL ONLY resource, and the UE may transmit (and/or receive) NR SL channels/signals based on the synchronization.

For example, in the aforementioned example, if the LTE synchronization reference and the NR synchronization reference are configured to be the same, it may be interpreted that the UE operates according to the same timing reference in performing transmit/receive operations for NR SL channels/signals on the LTE/NR SL shared resource (and/or the LTE SL ONLY resource) and the NR SL ONLY resource. In the above example, in the case of the UE performing transmit/receive operations for NR SL channels/signals on the LTE/NR SL shared resource (and/or the LTE SL ONLY resource) and the NR SL ONLY resource according to the same timing reference, a GNSS may be set/limit to the highest synchronization reference priority.

The synchronization reference for LTE or NR described in the above proposal may be a GNSS and/or a base station (e.g., eNB, gNB) and/or a UE (directly synchronized to the GNSS (within network coverage or outside network coverage) and/or time/frequency synchronized to the base station, and/or other independent UEs).

Based on an embodiment of the present disclosure, if the UE transmits (and/or receives) NR SL channels/signals on the LTE/NR SL shared resource (and/or the LTE SL ONLY resource), the UE may be required to maintain resources occupied by the UE for a pre-configured (minimum or maximum or average) time or longer. This may help to improve the sensing accuracy of the LTE UE performing transmit and receive operations within the corresponding resources.

For example, if the UE transmits (and/or receives) NR SL channels/signals on the LTE/NR SL shared resource (and/or the LTE SL ONLY resource), the UE may perform LTE-based sensing operations (on the resource as opposed to sensing operations on the NR ONLY resource) (e.g., RSRP measurement operations based on DM-RS on a PSSCH (scheduled by a PSCCH that has successfully decoded) and/or S-RSSI measurement operations (based on V2X resource pool-related subchannels)), and/or the UE may only perform some of the LTE SL sensing operations (e.g., S-RSSI measurement operations (based on V2X resource pool-related subchannels) and/or RSRP measurement operations based on DM-RS on a PSSCH (scheduled by a PSCCH that has successfully decoded)). According to the operations described above, due to different sensing operations between NR SL and LTE SL, when an (advanced and/or legacy) NR UE is transmitting (and/or receiving) NR SL channels/signals on the LTE/NR SL shared resource, the UE may be configured to perform the LTE sensing operations. This may be for the purpose of coexisting with LTE UEs transmitting/receiving on LTE SL channels/signals on the corresponding resource. Furthermore, in such cases, while it may be possible for the (advanced and/or legacy) NR UE to perform all of the LTE sensing operations, the (advanced and/or legacy) NR UE may be allowed to perform only a part of the LTE sensing operations in order to reduce UE implementation/computational complexity.

Based on an embodiment of the present disclosure, the UE may not be capable of performing simultaneous transmission/reception operations (and/or simultaneous transmission operations and/or simultaneous reception operations) of NR SL and LTE SL (on different frequency resources). In this case, when the UE transmits (and/or receives) NR SL channels/signals on the LTE/NR SL shared resource (and/or the LTE SL ONLY resource and/or the NR SL ONLY resource), the UE may be configured to start sensing operations for transmission of the channels/signals upon arrival of the corresponding TB. Herein, for example, if the UE is not capable of performing simultaneous transmission/reception operations of NR SL and LTE SL, and the UE constantly performs sensing operations on resources for the purpose of transmitting (and/or receiving) NR SL channels/signals on the LTE/NR SL shared resource (and/or the LTE SL ONLY resource), a disadvantage may occur that the UE loses the opportunity to transmit on the NR SL ONLY resource while performing such operations. Therefore, such UEs may perform sensing operations on the NR SL ONLY resource by default. Furthermore, it may be efficient for the UE to perform sensing operations (and/or start sensing operations upon arrival of a TB to transmit on the LTE/NR SL shared resource) only when the TB to transmit on the resource is present. In this way, from an in-device coexistence perspective, a half-duplex issue may be mitigated. In a more detailed example, the above operation may mean that the TB arrival time (or a later time) should be set as a start time of a sensing window defined in the mode 2 resource allocation operation. Alternatively, for example, the operation may be interpreted to mean that the sensing operation defined in the mode 2 resource allocation operation is started after a predefined minimum processing time after the TB arrival.

Based on various embodiments of the present disclosure, the UE can perform NR SL communication by using the LTE/NR SL shared resource. By doing so, an efficient use of frequency resources can be achieved. Further, by defining certain conditions under which the UE can use the LTE/NR SL shared resource and/or certain channels/signals that the UE can transmit on the LTE/NR SL shared resource, the effect of efficiently utilizing frequency resources while ensuring the quality of SL communication can be achieved, and it can be possible to efficiently coexist two different communication technologies such as LTE SL and NR SL on the limited frequency resource.

FIG. 14 shows a method for performing wireless communication by a first device, based on an embodiment of the present disclosure. The embodiment of FIG. 14 may be combined with various embodiments of the present disclosure.

Referring to FIG. 14, in step S1410, the first device may determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource. In step S1420, the first device may perform the NR SL communication with a second device based on the first resource. For example, the second resource may be a resource on which the E-UTRA-based SL communication is not allowed.

Additionally, for example, the first device may measure a sidelink-received signal strength indicator (S-RSSI) in a time interval. For example, based on that the S-RSSI measured in the time interval is lower than a threshold, the first device may be allowed to perform the NR SL communication based on the first resource.

Additionally, for example, the first device may measure a reference signal received power (RSRP) based on a demodulation reference signal (DMRS) for a physical sidelink shared channel (PSSCH). For example, based on not detecting E-UTRA-based SL transmission having an RSRP higher than a threshold, the first device may be allowed to perform the NR SL communication based on the first resource.

Additionally, for example, the first device may measure a reference signal received power (RSRP) based on a demodulation reference signal (DMRS) for a physical sidelink shared channel (PSSCH). For example, based on that E-UTRA-based SL transmission having an RSRP higher than a threshold is detected, and based on that a third resource for the E-UTRA-based SL transmission in the first resource overlaps a fourth resource for PSFCH reception, the first device may not be allowed to perform PSSCH transmission based on a fifth resource for the PSSCH transmission related to the fourth resource.

For example, based on not detecting E-UTRA-based SL transmission having a priority higher than a threshold priority, the first device may be allowed to perform the NR SL communication based on the first resource.

For example, based on that E-UTRA-based SL transmission having a priority higher than a threshold priority is detected, and based on that a third resource for the E-UTRA-based SL transmission in the first resource overlaps a fourth resource for PSFCH reception, the first device may not be allowed to perform PSSCH transmission based on a fifth resource for the PSSCH transmission related to the fourth resource.

For example, the NR SL communication allowed on the first resource may be physical sidelink control channel (PSCCH) transmission, PSCCH reception, physical sidelink shared channel (PSSCH) transmission, PSSCH reception, sidelink-synchronization signal block (S-SSB) transmission, or S-SSB reception. For example, physical sidelink feedback channel (PSFCH) reception for the PSSCH transmission or PSFCH transmission for the PSSCH reception may not be allowed on the first resource.

For example, performing the NR SL communication with the second device based on the first resource may comprise: transmitting first sidelink control information (SCI) for scheduling of a physical sidelink shared channel (PSSCH) to the second device through a physical sidelink control channel (PSCCH) based on the first resource; and transmitting second SCI and data to the second device through the PSSCH. For example, hybrid automatic repeat request (HARQ) feedback for the data may be received from the second device based on the second resource.

For example, the NR SL communication allowed on the first resource may be transmission or reception of data having a latency requirement greater than a threshold.

For example, the first device may not be allowed to perform initial transmission related to a transport block (TB) on the first resource, and the first device may be allowed to perform retransmission related to the TB on the first resource.

For example, a time domain for preferentially performing SL communication based on the first resource over performing SL communication based on the second resource may be configured for the first device.

For example, a synchronization reference related to NR SL communication allowed on the first resource and a synchronization reference related to NR SL communication allowed on the second resource may be configured independently for the first device.

The proposed method can be applied to devices according to various embodiments of the present disclosure. First, the processor 102 of the first device 100 may determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource. In addition, the processor 102 of the first device 100 may control the transceiver 106 to perform the NR SL communication with a second device based on the first resource.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource; and perform the NR SL communication with a second device based on the first resource. For example, the second resource may be a resource on which the E-UTRA-based SL communication is not allowed.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource; and perform the NR SL communication with a second UE based on the first resource. For example, the second resource may be a resource on which the E-UTRA-based SL communication is not allowed.

Based on an embodiment of the present disclosure, a non-transitory computer-readable storage medium storing instructions may be provided. For example, the non-transitory computer-readable storage medium storing instructions, when executed, may cause a first device to: determine, among a first resource on which evolved-universal mobile telecommunications system (UMTS) terrestrial radio access (E-UTRA)-based sidelink (SL) communication and NR-based SL communication are allowed and a second resource on which the NR-based SL communication is allowed, to perform NR SL communication based on the first resource; and perform the NR SL communication with a second device based on the first resource. For example, the second resource may be a resource on which the E-UTRA-based SL communication is not allowed.

Figure 15:
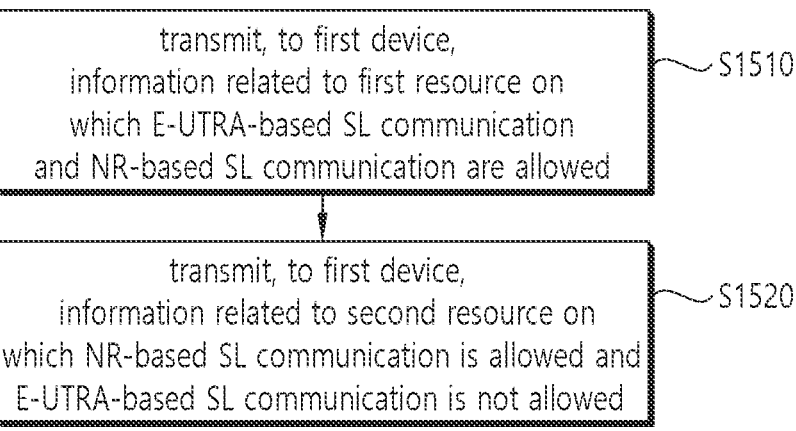
FIG. 15 shows a method for performing wireless communication by a base station, based on an embodiment of the present disclosure.

FIG. 15 shows a method for performing wireless communication by a base station, based on an embodiment of the present disclosure. The embodiment of FIG. 15 may be combined with various embodiments of the present disclosure.

Referring to FIG. 15, in step S1510, the base station may transmit, to a first device, information related to a first resource on which evolved-universal mobile telecommunications system (UMTS) terrestrial radio access (E-UTRA)-based sidelink (SL) communication and NR-based SL communication are allowed. In step S1520, the base station may transmit, to the first device, information related to a second resource on which the NR-based SL communication is allowed and the E-UTRA-based SL communication is not allowed. For example, among the first resource or the second resource, it may be determined by the first device to perform NR SL communication based on the first resource.

The proposed method can be applied to devices according to various embodiments of the present disclosure. First, the processor 202 of the base station 200 may control the transceiver 206 to transmit, to a first device, information related to a first resource on which evolved-universal mobile telecommunications system (UMTS) terrestrial radio access (E-UTRA)-based sidelink (SL) communication and NR-based SL communication are allowed. In addition, the processor 202 of the base station 200 may control the transceiver 206 to transmit, to the first device, information related to a second resource on which the NR-based SL communication is allowed and the E-UTRA-based SL communication is not allowed. For example, among the first resource or the second resource, it may be determined by the first device to perform NR SL communication based on the first resource.

Based on an embodiment of the present disclosure, a base station adapted to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a first resource on which evolved-universal mobile telecommunications system (UMTS) terrestrial radio access (E-UTRA)-based sidelink (SL) communication and NR-based SL communication are allowed; and transmit, to the first device, information related to a second resource on which the NR-based SL communication is allowed and the E-UTRA-based SL communication is not allowed. For example, among the first resource or the second resource, it may be determined by the first device to perform NR SL communication based on the first resource.

Based on an embodiment of the present disclosure, an apparatus adapted to control a base station may be provided. For example, the apparatus may comprise: one or more processors; and one or more memories operably connected to the one or more processors and storing instructions. For example, the one or more processors may execute the instructions to: transmit, to a first user equipment (UE), information related to a first resource on which evolved-universal mobile telecommunications system (UMTS) terrestrial radio access (E-UTRA)-based sidelink (SL) communication and NR-based SL communication are allowed; and transmit, to the first UE, information related to a second resource on which the NR-based SL communication is allowed and the E-UTRA-based SL communication is not allowed. For example, among the first resource or the second resource, it may be determined by the first UE to perform NR SL communication based on the first resource.

Based on an embodiment of the present disclosure, a non-transitory computer-readable storage medium storing instructions may be provided. For example, the non-transitory computer-readable storage medium storing instructions, when executed, may cause a base station to: transmit, to a first device, information related to a first resource on which evolved-universal mobile telecommunications system (UMTS) terrestrial radio access (E-UTRA)-based sidelink (SL) communication and NR-based SL communication are allowed; and transmit, to the first device, information related to a second resource on which the NR-based SL communication is allowed and the E-UTRA-based SL communication is not allowed. For example, among the first resource or the second resource, it may be determined by the first device to perform NR SL communication based on the first resource.

It is obvious that the above-described examples of proposed methods may also be included as one of the implementation methods of the present disclosure, and thus may be considered as a kind of proposed methods.

Meanwhile, the present disclosure is not limited to direct communication between UEs, and may also be used in uplink or downlink, wherein a base station or a relay node or the like may use the above-described proposed methods. Also, in the present disclosure, the UE refers to a user's terminal, but if a network equipment such as a base station transmits/receives signals according to a communication method between UEs, it can also be considered a kind of the UE.

Furthermore, a rule may be defined so that information on whether or not to apply the proposal methods (or information on the rules of the proposal methods) should be notified from a base station to a UE or from a transmitting UE to a receiving UE through a predefined signal (e.g., a physical layer signal or a higher layer signal).

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Nirtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
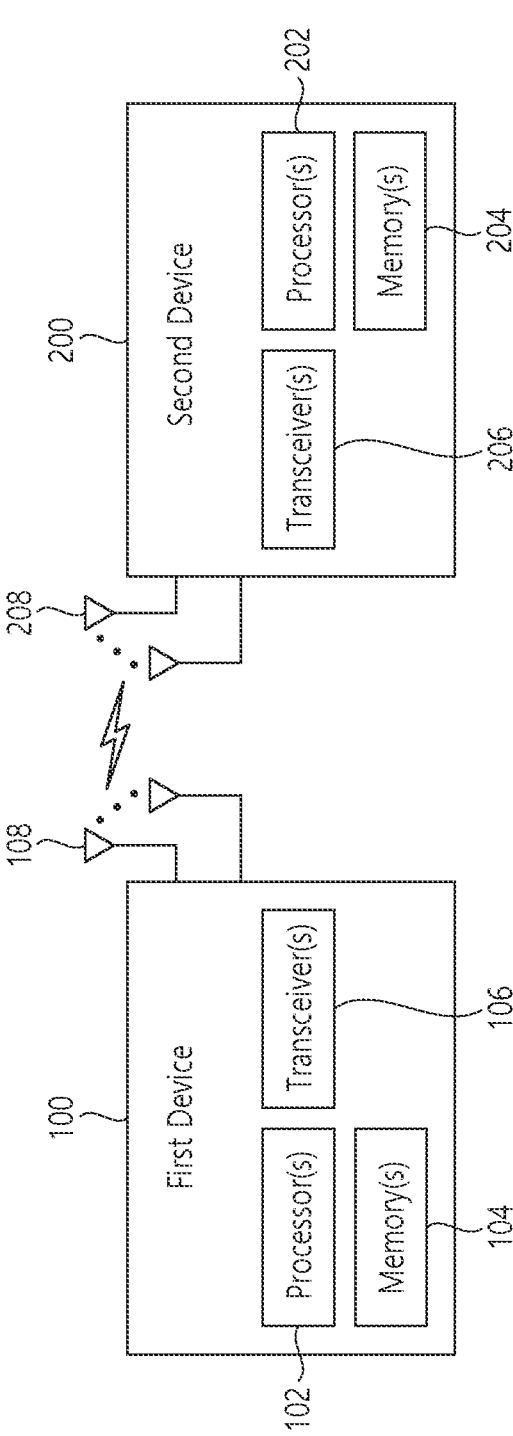
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, (the first wireless device 100 and the second wireless device 200) may correspond to (the wireless device 100x and the BS 200) and/or (the wireless device 100x and the wireless device 100x) of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
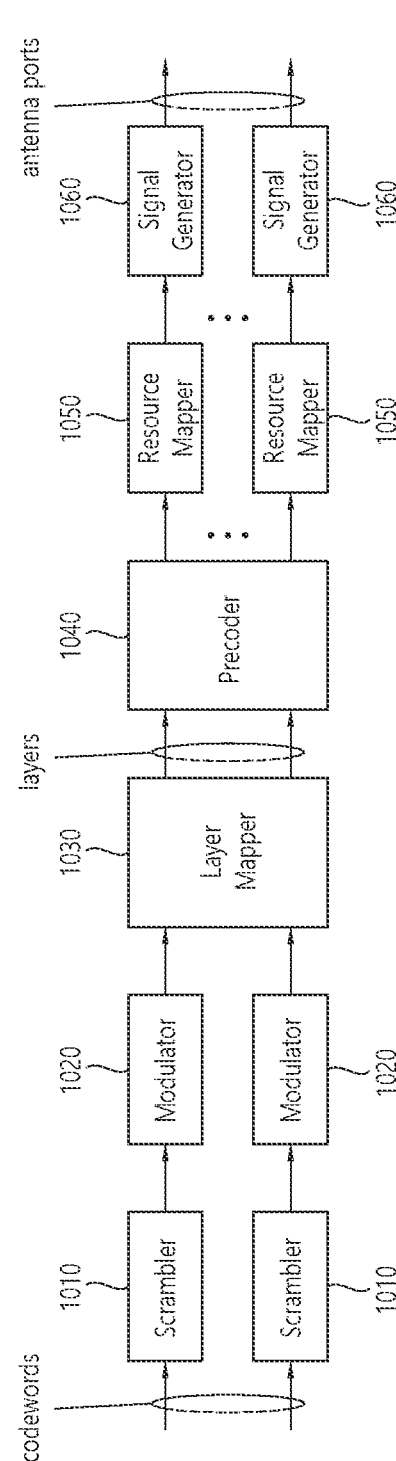
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

Hereinafter, an example of implementing FIG. 19 will be described in detail with reference to the drawings.

Figure 20:
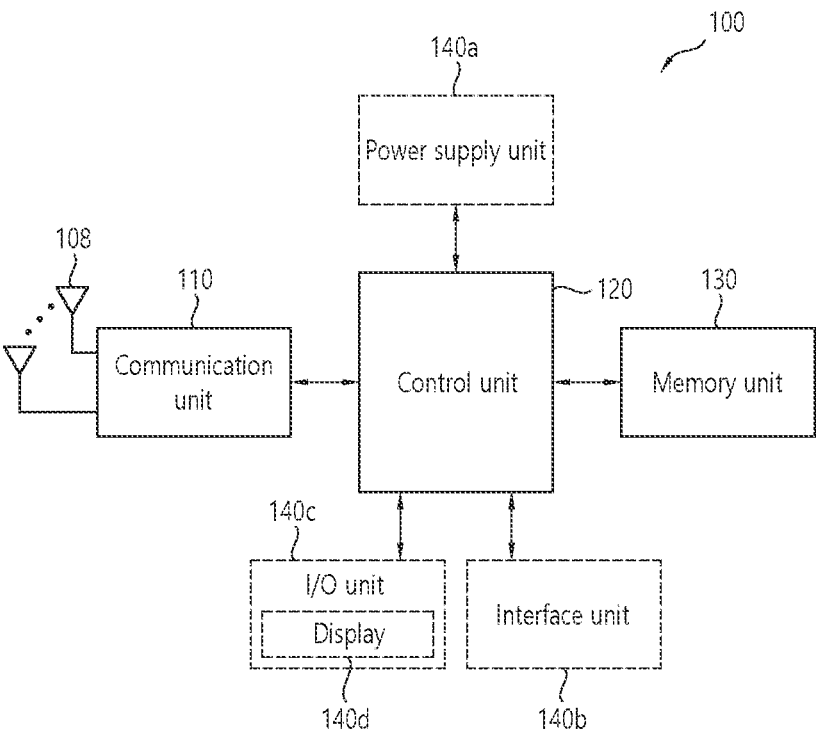
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
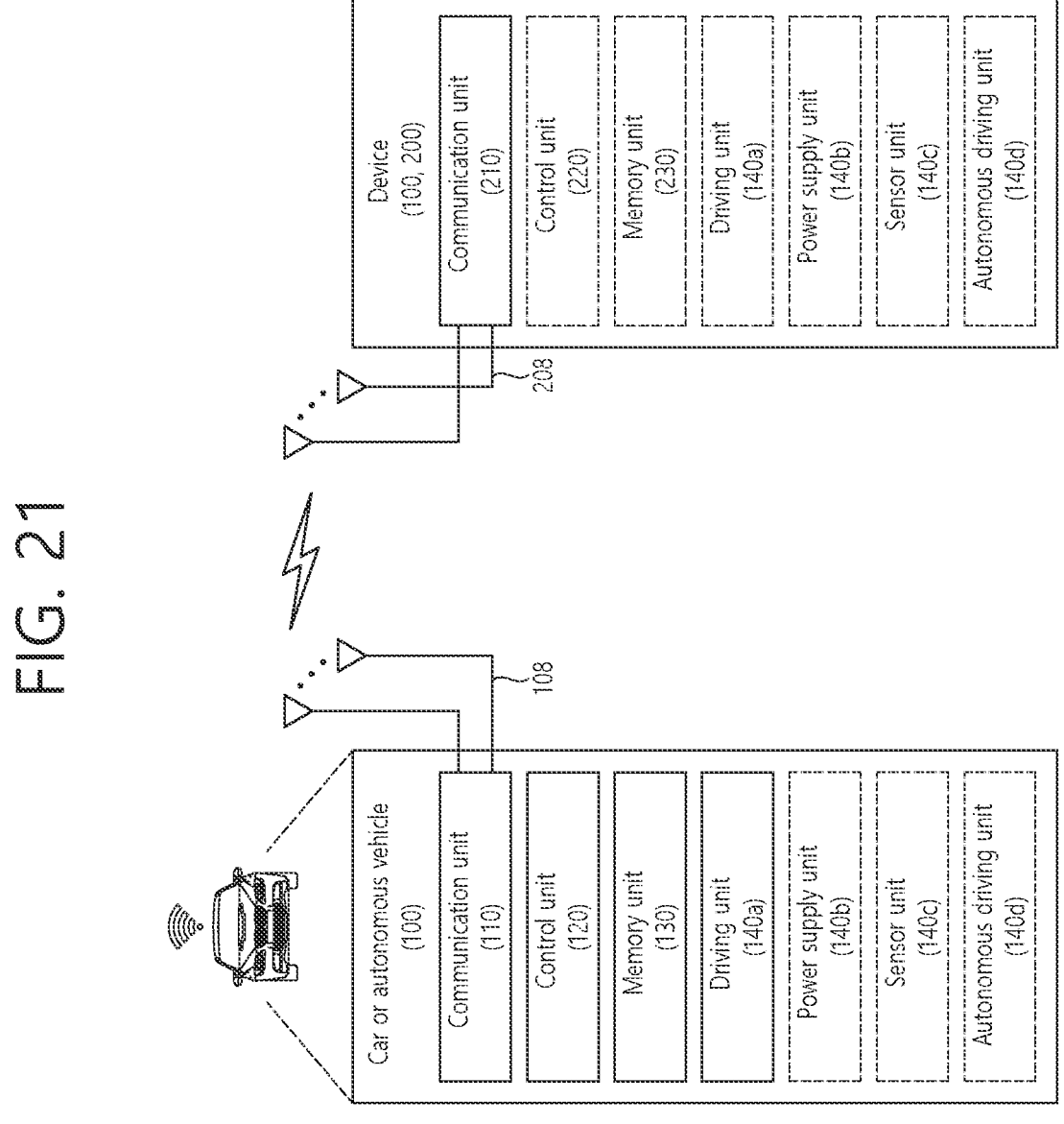
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, information related to a resource pool;

determining, by the first device, resources included in the resource pool within a time interval; and selecting, by the first device, a transmission resource based on the resources, wherein, based on (i) long term evolution (LTE) reference signal received power (RSRP) measurement related to an LTE sidelink (SL) resource being higher than a threshold and (ii) the LTE SL resource which overlaps with a physical sidelink feedback channel (PSFCH) resource related to an NR SL resource, the NR SL resource is not selected as the transmission resource.

2. The method of claim 1, wherein the resource pool is configured with the PSFCH resource.

3. The method of claim 1, wherein the LTE RSRP measurement is obtained based on physical sidelink shared channel (PSSCH) demodulation reference signal (DMRS).

4. The method of claim 1, further comprising:

obtaining first priority information for NR SL transmission; and receiving, from a second device, sidelink control information including second priority information and resource reservation information related to the LTE SL resource.

5. The method of claim 4, wherein the threshold is obtained based on the first priority information and the second priority information.

6. The method of claim 1, wherein the threshold related to the LTE RSRP measurement is configured independently of a threshold related to NR RSRP measurement.

7. The method of claim 1, wherein the NR SL resource is determined based on a minimum time gap between the NR SL resource and the PSFCH resource.

8. The method of claim 1, further comprising:

transmitting, based on the transmission resource, first sidelink control information for scheduling of a physical sidelink shared channel (PSSCH) and second sidelink control information through a physical sidelink control channel (PSCCH); and transmitting, based on the transmission resource, the second sidelink control information and data through the PSSCH.

9. A first device comprising:

at least one transceiver;

at least one processor; and at least one memory connected to the at least one processor and storing instructions that, based on being executed, cause the first device to perform operations comprising:

obtaining information related to a resource pool;

determining resources included in the resource pool within a time interval; and selecting a transmission resource based on the resources, wherein, based on (i) long term evolution (LTE) reference signal received power (RSRP) measurement related to an LTE sidelink (SL) resource being higher than a threshold and (ii) the LTE SL resource which overlaps with a physical sidelink feedback channel (PSFCH) resource related to an NR SL resource, the NR SL resource is not selected as the transmission resource.

10. The first device of claim 9, wherein the resource pool is configured with the PSFCH resource.

11. The first device of claim 9, wherein the LTE RSRP measurement is obtained based on physical sidelink shared channel (PSSCH) demodulation reference signal (DMRS).

12. The first device of claim 9, wherein the operations further comprise: obtaining first priority information for NR SL transmission; and receiving, from a second device, sidelink control information including second priority information and resource reservation information related to the LTE SL resource.

13. The first device of claim 12, wherein the threshold is obtained based on the first priority information and the second priority information.

14. The first device of claim 9, wherein the threshold related to the LTE RSRP measurement is configured independently of a threshold related to NR RSRP measurement.

15. A processing device comprising:

at least one processor; and at least one memory connected to the at least one processor and storing instructions that, based on being executed, cause a first device to perform operations comprising:

obtaining information related to a resource pool;

determining resources included in the resource pool within a time interval; and selecting a transmission resource based on the resources, wherein, based on (i) long term evolution (LTE) reference signal received power (RSRP) measurement related to an LTE sidelink (SL) resource being higher than a threshold and (ii) the LTE SL resource which overlaps with a physical sidelink feedback channel (PSFCH) resource related to an NR SL resource, the NR SL resource is not selected as the transmission resource.

16. The processing device of claim 15, wherein the resource pool is configured with the PSFCH resource.

17. The processing device of claim 15, wherein the LTE RSRP measurement is obtained based on physical sidelink shared channel (PSSCH) demodulation reference signal (DMRS).

18. The processing device of claim 15, wherein the operations further comprise: obtaining first priority information for NR SL transmission; and receiving, from a second device, sidelink control information including second priority information and resource reservation information related to the LTE SL resource.

19. The processing device of claim 18, wherein the threshold is obtained based on the first priority information and the second priority information.

20. The processing device of claim 15, wherein the threshold related to the LTE RSRP measurement is configured independently of a threshold related to NR RSRP measurement.

* * * * *